(12) United States Patent
Gagnon et al.

(10) Patent No.: US 7,402,815 B2
(45) Date of Patent: Jul. 22, 2008

(54) METHOD AND APPARATUS FOR REVERSING PERFORMANCE DEGRADATION IN SEMI-CONDUCTOR DETECTORS

(75) Inventors: Daniel Gagnon, Twinsburg, OH (US); Jerome J. Griesmer, Mentor, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 226 days.

(21) Appl. No.: 10/595,433

(22) PCT Filed: Oct. 6, 2004

(86) PCT No.: PCT/IB2004/052001

§ 371 (c)(1),
(2), (4) Date: Apr. 19, 2006

(87) PCT Pub. No.: WO2005/040854

PCT Pub. Date: May 6, 2005

(65) Prior Publication Data

US 2006/0289776 A1 Dec. 28, 2006

Related U.S. Application Data

(60) Provisional application No. 60/513,397, filed on Oct. 22, 2003.

(51) Int. Cl.
G01T 1/24 (2006.01)
(52) U.S. Cl. .................................. 250/370.13
(58) Field of Classification Search ............ 250/370.01, 250/370.02, 370.03, 370.13, 370.04, 370.05, 250/370.06, 370.07, 370.08, 370.09, 370.1, 250/370.11, 370.12, 370.14, 370.15; 29/610.1

See application file for complete search history.

(56) References Cited

U.S. PATENT DOCUMENTS

| 3,255,054 | A | * | 6/1966 | Norton ........................ 438/54 |
| 3,533,857 | A | * | 10/1970 | Marsh et al. ................ 438/528 |
| 4,013,485 | A | | 3/1977 | Ma et al. |
| 5,457,322 | A | | 10/1995 | Kitaguchi et al. |
| 6,204,087 | B1 | | 3/2001 | Parker et al. |
| 6,323,490 | B1 | * | 11/2001 | Ikeda et al. ............ 250/370.09 |

(Continued)

OTHER PUBLICATIONS

Hamilton, W.J., et al.; Very High Resolution Detection of Gamma Radiation at Room-Temperature using P-I-N Detectors of CdZnTe and HgCdTe; 1994; IEEE NSSMIC; 1:232-235.

(Continued)

*Primary Examiner*—David P. Porta
*Assistant Examiner*—Kiho Kim

(57) ABSTRACT

A system reverses degraded energy resolution of semiconductor radiation detection elements (44) which are used in a radiation detector assembly. A means (38) identifies semiconductor elements which exhibit degraded energy resolution as compared to an initial level of energy resolution after application of the forward bias. A means (40) restores the degraded semiconductor elements to the initial level of energy resolution by applying the reverse bias. A heater (74) accelerates the restoration process by supplying an elevated ambient temperature. A screening means (48) screens new semiconductor elements to identify the elements which are susceptible to degradation. A forward bias is applied by a forward bias means (50) to induce the degradation. A heater (52) increases an ambient temperature to accelerate the performance degradation in the new semiconductor elements. The identified degradable elements are treated with a reverse bias prior to installation in the detector.

24 Claims, 3 Drawing Sheets

U.S. PATENT DOCUMENTS

| | | |
|---|---|---|
| 6,486,476 B1 | 11/2002 | Ochiai et al. |
| 2003/0035510 A1 | 2/2003 | Strommer |
| 2003/0085358 A1* | 5/2003 | El-Hanany et al. ..... 250/370.13 |

OTHER PUBLICATIONS

Osinski, M., et al.; Effects of proton irradiation of AlGaN/InGaN/GaN green light emitting diodes; 1997; Electronics Letters; 33(14)1252-1253.

* cited by examiner

METHOD AND APPARATUS FOR REVERSING PERFORMANCE DEGRADATION IN SEMI-CONDUCTOR DETECTORS

CROSS REFERENCE TO RELATED APPLICATIONS

This application claims the benefit of U.S. provisional application Ser. No. 60/513,397 filed Oct. 22, 2003, which is incorporated herein by reference.

The present invention relates to the radiation detector arts. It particularly relates to the nuclear imaging systems using semiconductor detectors such as single photon emission computed tomography (SPECT) systems and with positron emission tomography (PET) imaging system. However, the invention will also find application in other radiation detection devices using semiconductor detectors for non-imaging applications, other imaging modalities, manufacturing processes for solid-state detectors, and the like.

Nuclear imaging employs a source of radioactivity to image the anatomy of a subject. Typically, a radiopharmaceutical is injected into the patient. Radiopharmaceutical compounds contain a radioisotope that undergoes gamma-ray decay at a predictable rate and characteristic energy. A radiation detector is placed adjacent to the patient to monitor and record emitted radiation. Often, the detector is rotated or indexed around the patient to monitor the emitted radiation from a plurality of directions. Based on information such as detected position and energy, the radiopharmaceutical distribution in the body is determined and an image of the distribution is reconstructed to study the circulatory system, radiopharmaceutical uptake in selected organs or tissue, and the like.

Although detector heads with a single, large scintillator and an array of photomultiplier tubes are currently the most common, others have proposed using an array of small scintillators, each associated with a photodiode or other photosensitive solid-state device which senses scintillation in each individual scintillation crystal. Arrays of individual solid state radiation detectors, such as cadmium-zinc-telluride (CZT) detectors, cadmium-telluride detectors, and the like, which utilize the photoelectric effect to detect radiation have advantages over the scintillation crystal/photodetector designs. In a solid state detector, received radiation photons liberate electrons from their orbits around atoms of the target material. A high bias voltage is applied across the detector material to aid the photoelectric phenomenon and electron propagation. The electrons are detected as an electrical pulse signal. Although very good performance can generally be expected from CZT, the inventors herein have noted that a fraction of pixels show significant degradation of the energy resolution with time. The energy resolution of a semiconductor detector, e.g. the ability of the system to distinguish between two events of different energy, is a critical element of the imaging system.

Because nuclear cameras are typically in use with their detectors biased for long duty cycles and have exacting performance standards, degradation of their detectors is a significant problem. However, this inconsistent solid-state detector degradation adversely affects a wide range of equipment that incorporate CZT and other solid-state detectors.

The present inventors have identified the degradation as being associated with the presence of the bias voltage. Turning off the bias between uses of the system significantly reduces the rate of degradation. However, medical imaging systems are typically operated substantially continually or at least for extended hours. For good patient throughput with these expensive machines, on average, the "OFF" time for the imaging machine is typically small as compared to the "ON" time. With such a schedule, noticeable degradation can occur in as little as six months.

There is a need for a technique that allows identifying or recovering degraded pixels to avoid costly replacements and stoppages of the imaging equipment. The present invention provides a new and improved imaging apparatus and method which overcomes the above-referenced problems and others.

In accordance with one aspect of the present invention, a system for reversing degraded energy resolution of semiconductor radiation detection elements which are used in a radiation detector assembly is disclosed. A means identifies semiconductor elements which exhibit degraded energy resolution as compared to an initial level of energy resolution. A means restores the degraded semiconductor elements to the initial level of energy resolution by applying a reverse bias at an elevated ambient temperature.

In accordance with another aspect of the present invention, a method of restoring a degraded performance of semiconductor elements is disclosed. Semiconductor elements which exhibit degraded energy resolution as compared to an initial level of energy resolution are identified. Identified degraded semiconductor elements are restored to the initial level of energy resolution by applying a reverse bias and an elevated ambient temperature.

One advantage of the present invention resides in recovering the initial intrinsic performance of semiconductor elements.

Another advantage of the present invention resides in screening new semiconductor elements for susceptibility to degraded performance and applying a recovery procedure before semiconductor elements are installed in a detector.

Another advantage of present invention resides in grouping new semiconductor elements based on performance criteria to install semiconductor elements with similar characteristics in one assembly.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
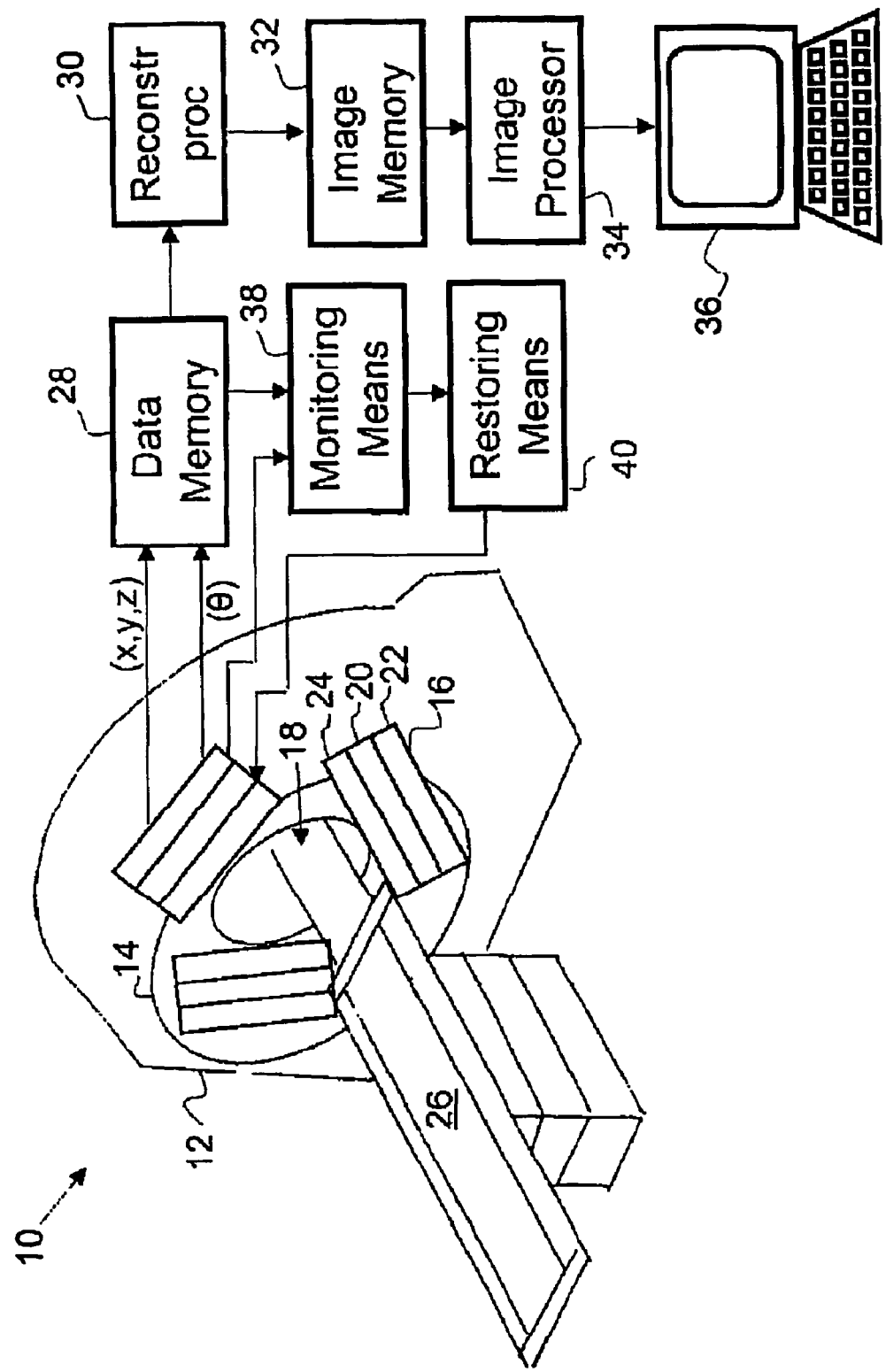
FIG. 1 is a diagrammatic illustration of a diagnostic imaging system.

With reference to FIG. 1, a nuclear imaging device 10 typically includes a stationary gantry 12 that supports a rotating gantry 14. One or more detector heads 16 are carried by the rotating gantry 14 to detect radiation events emanating from a region of interest or examination region 18. Each detector head includes a two-dimensional array 20 of detector elements. In the preferred embodiment, the detector array 20 includes an array of cadmium telluride or cadmium zinc telluride (CZT) solid state semiconductor detector elements or crystals. Other semiconductor detectors, which convert gamma radiation directly into electrical charge, are also contemplated. Each head 16 includes circuitry 22 for converting each radiation response into a digital signal indicative of its location (x, y) on the detector face and its energy (z). In SPECT imaging, a collimator 24 controls the direction and angular spread, from which each detector element of the array 20 can receive radiation.

Typically, an object to be imaged is injected with one or more radiopharmaceutical or radioisotopes and placed in the examination region 18 supported by a couch 26. The presence of the pharmaceuticals within the object produces emission radiation from the object. Radiation is detected by the detector heads 16 which are, preferably, angularly indexed or rotated around the examination region 18 to collect the emission data from a plurality of directions. The projection emission data (x, y, z) and an angular position (θ) of each detector head 16 around the examination region 18 are stored in a data storage 28. A reconstruction processor 30 processes the event and detector orientation data from the data storage 28 into a volumetric image representation. The image representation is then stored at a volume image memory 32 for manipulation by a video processor 34 and display on an image display 36 such as a video monitor, printer, or the like.

With time, the response of the detector elements degrades. However, the degradation is not the same for every element. Some may show no noticeable degradation when others show significant degradation. To counter the degradation, a degraded detector element monitoring or identifying means or identifying process 38 monitors the output of individual detector elements and indicates degraded elements. The means 38 can monitor all elements or, if elements with a tendency to degrade have been identified in a screening procedure during manufacture, only selected elements are watched to identify degrading beyond a preselected limit. A degradation reversing system or restoring means 40 is enabled to reverse the degradation monitored by the monitor 38 either periodically or if a threshold level of degradation is detected.

Figure 2:
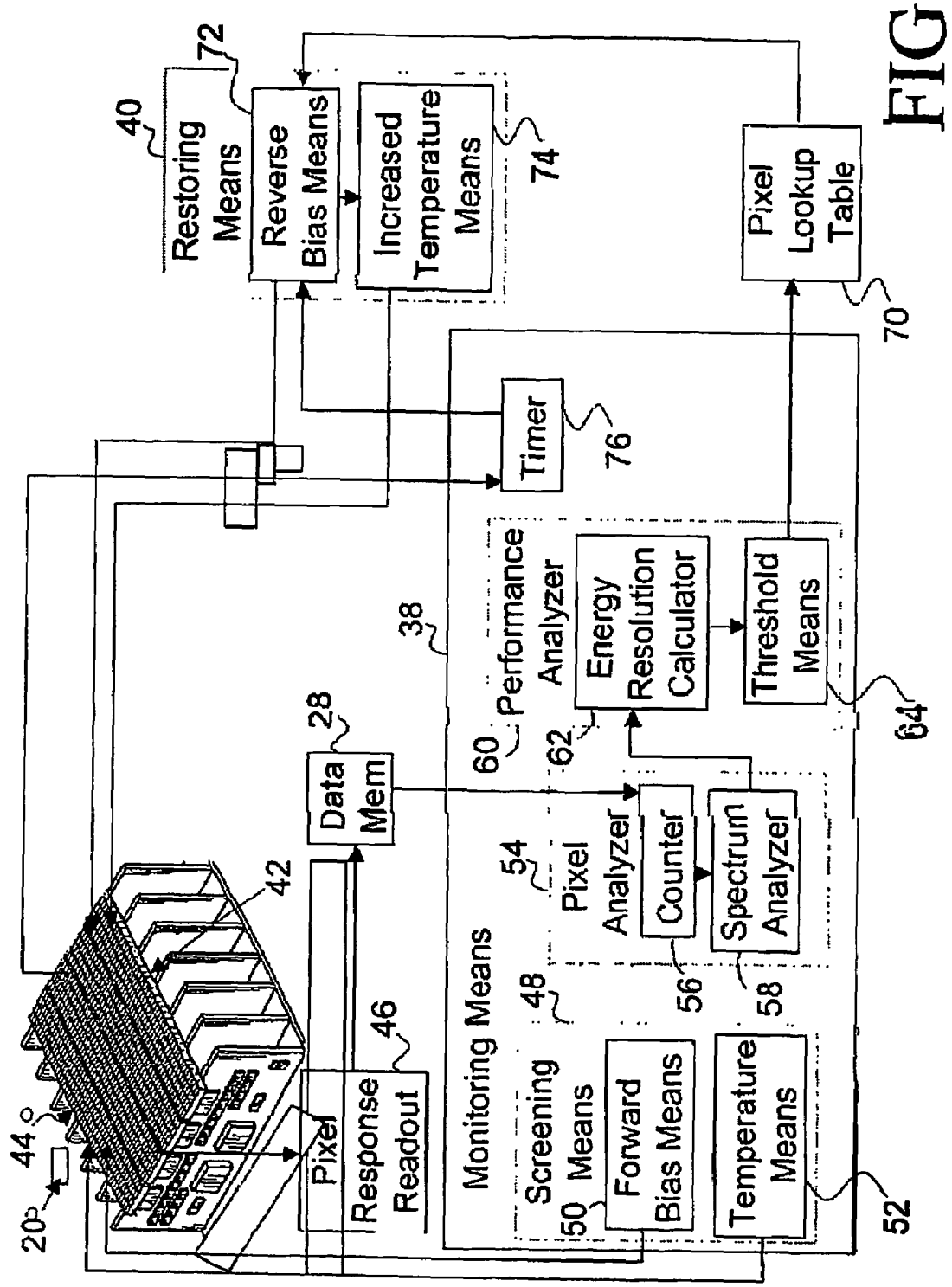
FIG. 2 is a diagrammatic illustration of a restoring system in accordance with the present application.

During a manufacturing process, the detector arrays are prescreened to identify defective elements and elements with a tendency to degrade. With particular reference to FIG. 2, the detector array 20 includes individual semiconductor tiles 42 each including a plurality, e.g., 32, of individual elements or pixels 44 arranged in a rectangular matrix. In a standard mode, a screening technique screens the array 20 on a pixel-by-pixel basis. The response of each pixel 44 is collected by a pixel response readout 46 and stored in the data memory 28. The pixel response readout 46 includes analog-to-digital converters, multiplexers, and so forth, as necessary to treat each pixel as a separate channel. The monitoring means 38 retrieves the pixel data from the data memory 28 to identify pixels exhibiting a reduced performance as discussed in a greater detail below.

With continuing reference to FIG. 2, the monitoring means 38 alternatively includes a screening procedure or means 48, which initiates screening of newly manufactured semiconductor elements 44 to detect reduced performance prior to a use with an imaging system. A forward bias means 50 applies a normal bias to the semiconductor elements 44 for a predetermined period of time. A temperature means or heater 52 is used to increase the ambient temperature to accelerate the screening process, e.g. to make latently degradable semiconductor elements to degrade faster, since the increased temperature has been shown to be conducive to the performance degradation. A pixel response readout 46 collects the response of each pixel 44 and stores the data in the data memory 28.

Figure 3:
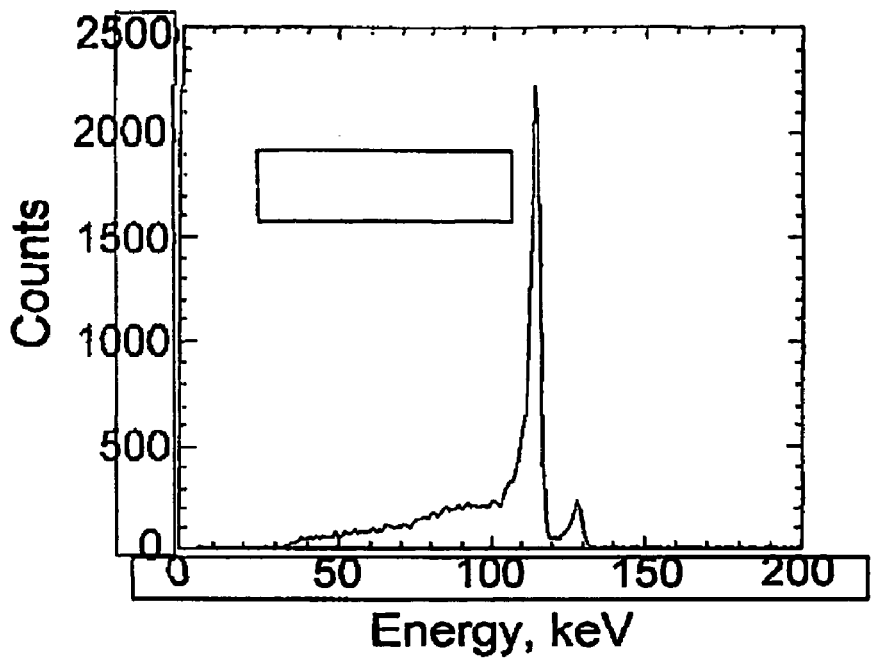
FIG. 3 is a histogram of the response of a pixel exhibiting good energy resolution.

The monitoring means 38 includes a pixel analyzer 54, which analyzes the radiation activity of each pixel. The pixel analyzer 54 includes a counter 56, which sums the number of radiation events for each channel. A sufficient number of counts are needed to provide an accurate or reproducible depiction of each pixel's energy spectrum. To determine which pixels degraded or drifted, the number of counts recorded by each pixel 44 is counted. The counts are sorted according to pixel and energy, e.g., using a multichannel analyzer and a pulse analyzer, to generate a spectrum. The spectrum of each semiconductor element 44 is examined by a spectrum analyzing circuit 58 to determine the energy of each photon and find the element's distribution of the radiation intensity. By way of example, the distribution of the radiation intensity for Co-57 can be expressed as a curve of number of received photons versus energy as shown in FIG. 3 for an ideal element. A histogram of the response of a given pixel 44 is representative of the two emission peaks of Co-57 at 122 and 136 keV respectively. The low background is composed of scatter events and incomplete charge collection.

With continuing reference to FIG. 2, the monitoring means 38 further includes a performance analyzer 60, which determines whether any of the semiconductor elements 44 exhibits a degraded performance. More specifically, the performance of each element 44 is measured against a predetermined performance criteria, preferably, an exemplary or nominal distribution of the radiation intensity of a perfect crystal expressed as a corrective curve. The performance analyzer 60 includes an energy resolution calculator 62 which compares the response of the pixel 44 with the response of the perfect element and calculates an offset of the width of the pixel's 44 peak at half its height from the location of the corrective peak.

Figure 4:
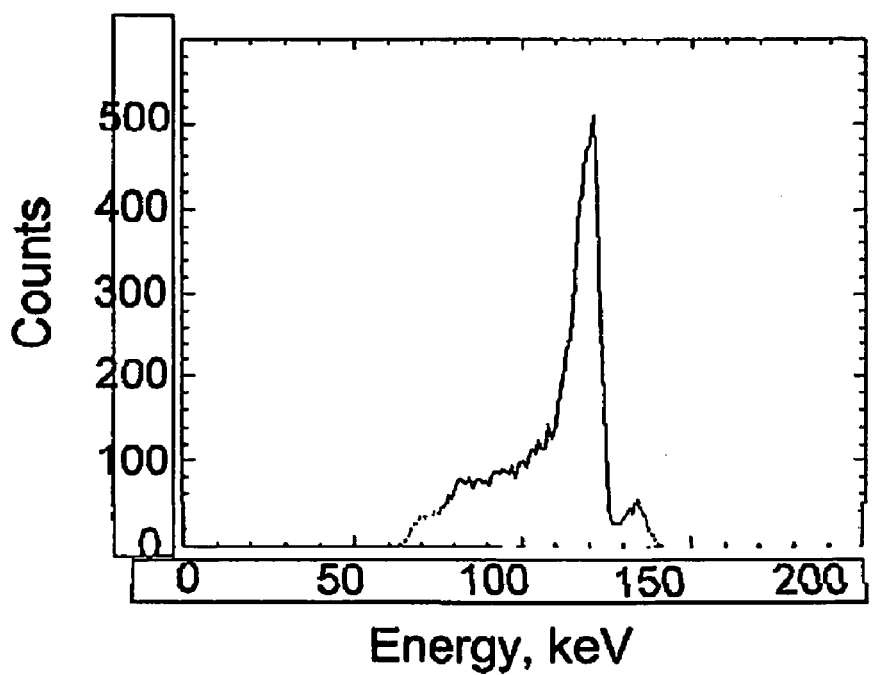
FIG. 4 is a histogram of the response of a pixel exhibiting bad energy resolution.

In the example illustrated in FIG. 3, the performance of the given pixel has been computed to be 3.6% FWHM, i.e., good energy resolution. The majority of pixels similarly exhibits good energy resolution. Typically, the performance of the semiconductor tile 42, which has thirty two elements, averages at about 3-3.5% FWHM. Some crystal elements, however, do not exhibit a single or well defined peak from the beginning of service or develop underperformance later on, after being subjected to voltage bias. The performance of semiconductor elements, which exhibit a good performance at the beginning of service, might drop from about 3-3.5% FWHM to about 6-7% FWHM after being exposed to forward bias over time. Exemplary spectra of pixel having poor energy resolution of 7.3% FWHM is shown in FIG. 4.

With continuing reference to FIG. 2, a threshold means 64 compares the energy resolution before any forward bias degradation has occurred with a preselected threshold value. Pixel addresses corresponding to pixels having energy resolution above the preselected threshold value are logged or recorded in a database or memory 70 as defective. When the detector 20 is placed into a diagnostic imaging apparatus 10, the defective detector elements are shut off, e.g., the gain correction value is set to zero, so that they produce no image output. Rather, the electronics of the detector head generate an output value for the turned off detector element based on the output of the surrounding elements, e.g., an average.

After the forward bias and elevated temperatures have been applied for a selected duration, the pixel analyzer 54 and the performance analyzer 60 again analyze the energy resolution of each detector element 44. Typically, the energy resolution of some of the detector elements will not degrade and others will degrade. Those elements whose energy resolution does degrade may also degrade at different rates or to different degrees.

Optionally, this analysis can be performed at intervals to determine the rate of energy resolution degradation for each detector element 44. Alternately, a single measurement can be made at a preselected time, e.g., a time corresponding to a normal maintenance interval.

After the analysis process has been completed, the identity of the defective pixels and the identity of the pixels whose energy resolution degrade with time is stored in a memory or look-up table 70. Optionally, a rate of degradation can also be stored.

Before shipping the detector array or installing it in a detector head, the restoring means 40 restores the degraded pixels, which have been identified by the screening procedure 48. More specifically, the restoring means 40 applies a reverse bias with a reverse bias applying means 72 to each of the detectors whose performance is degraded. Preferably, a heater 74 elevates the ambient temperature to about 60° C. to accelerate the recovery process. Once the arrays have been restored, they are ready for installation in a radiation detector. Preferably, the identified degradable semiconductor elements are grouped based on the degradation rate. The semiconductor elements with similar characteristics are installed in one assembly so that uniform recovery procedure can be applied. Such assembly simplifies the construction and use of the radiation detector while ensuring the maximum yield from the semiconductor manufacturer.

Optionally, the restoration process can also be applied to those elements which were denoted as defective. In some instances, the restoring process may restore a crystal that was initially defective. During the restoring process, the identifying process 38 can be repeated to be sure that all of the degraded elements have been restored to their full and optimum energy resolution. Any updates to the memory 70 can be made at the end of this restoration and checking process.

After the detector array has been installed in a detector, daily use of the detector will degrade the degradable detector elements. In one option, the monitoring means 38 monitors the outputs of the individual semiconductor elements 44, which are stored in the data memory 28, to check the energy distribution of the detected radiation. More specifically, the resultant data sets for acquired images can be examined to determine which elements detected a sufficient number of radiation events to be analyzed. The pixel analyzer 54 and the performance analyzer 60 then determine the energy resolution for at least the detector elements which were identified as being degradable elements. When the energy resolution of the degradable elements has risen above a preselected threshold, the detector is marked for restoration. Alternately, the monitoring means 38 may include a timer 76 which measures the time to which the detector elements had been subject to a forward bias. After a preselected amount of time, the detector is marked for the restoration process.

Once the detector is marked for the restoration process, the restoring means 40 associated with each imaging apparatus 10 automatically performs the restoration process or, alternatively, places a service call. The restoration process can be performed manually by a maintenance technician as a result of the service call, or during routine service. The maintenance technician may replace the degraded elements and/or put them in an identified recovery box. Alternatively, the restoration can be performed automatically when the diagnostic imaging apparatus is not in use. As another option, each time the diagnostic imaging apparatus 10 is shut off, a check of the amount of energy resolution degradation or a check of the total number of hours of operating time can be made and an appropriate correction can be made during the down time. In this manner, the detector elements might be restored every night, once a week, between patients, or the like.

The invention has been described with reference to the preferred embodiments. Modifications and alterations may occur to others upon a reading and understanding of the preceding detailed description. It is intended that the invention be constructed as including all such modifications and alterations insofar as they come within the scope of the appended claims or the equivalents thereof.

The invention claimed is:

1. A system for reversing degraded energy resolution of semiconductor radiation detection elements which are used in a radiation detector assembly wherein the semiconductor elements of the detector assembly are responsive to gamma radiation, the system comprising:
   a means for identifying semiconductor elements which exhibit degraded gamma radiation energy resolution as compared to an initial level of gamma radiation energy resolution; and
   a means for restoring the degraded semiconductor elements to the initial level of gamma radiation energy resolution.

2. The system as set forth in claim 1, wherein the semiconductor elements include an array of crystals selected from one of cadmium-zinc-telluride crystals and cadmium-telluride crystals.

3. The system as set forth in claim 1, wherein the restoring means further includes:
   a reverse bias means which applies a reverse bias to the identified degraded elements for a preselected time.

4. The system as set forth in claim 3, wherein the restoring means further includes:
   a heater, which supplies an elevated ambient temperature, when the reversed bias is applied to the identified degraded elements, to accelerate the recovery of the degraded elements.

5. The system as set up forth in claim 1, wherein the identifying means includes a screening means which facilitates identifying degradable semiconductor elements in a batch of new semiconductor elements, the screening means including:
   a forward bias means, which applies a forward bias to the semiconductor elements to induce a degradation of energy resolution; and
   a heater, which increases an ambient temperature to accelerate the degradation of the energy resolution in the new semiconductor elements.

6. The system as set forth in claim 5, wherein the restoring means further includes:
   a reverse bias means which applies a reverse bias to the identified degraded elements for a preselected time.

7. The system as set forth in claim 6, wherein the restoring means further includes:
   a heater, which supplies an elevated ambient temperature, when the reversed bias is applied to the identified degraded elements, to accelerate the recovery of the degraded elements.

8. A method of restoring a degraded performance of semiconductor elements comprising:
   identifying semiconductor elements which exhibit degraded energy resolution as compared to an initial level of energy resolution by applying a forward bias to the semiconductor elements to induce a degradation of energy resolution and heating to increase an ambient temperature to accelerate the degradation of the energy resolution in the semiconductor elements; and
   restoring degraded semiconductor elements to the initial level of energy resolution.

9. The method as set forth in claim 8, wherein in response to identifying a semiconductor with reduced energy resolution, a service call is placed and the step of restoring is performed by a service technician.

10. The method as set forth in claim 8, wherein restoring includes one of replacing the identified degraded semiconductor elements and restoring the identified semiconductor elements.

11. The method as set forth in claim 8, wherein during manufacture or assembly, the identified degradable semiconductor elements are grouped based on identified degradation criteria and groups with common degradation criteria are installed in a detector assembly and the restoring step is applied uniformly to the detector assembly.

12. An apparatus for restoring performance of semiconductor elements including:
an identifying processor to detect elements with degraded performance which results after application of forward bias, the identifying processor including a pixel analyzer which analyzes a response of each semiconductor element when the semiconductor elements are subjected to a radiation source, which pixel analyzer determines a spectral response of each semiconductor element; and
a restoration processor which controls restoration of energy resolution of degraded elements to an initial level of energy resolution.

13. The apparatus as set forth in claim 12, wherein the identifying means further includes:
a performance analyzer which compares a spectral response of each semiconductor element with preselected spectral response criteria and calculates energy resolution of each semiconductor element.

14. The apparatus as set forth in claim 13, wherein the identifying means further includes:
a threshold processor which compares a calculated energy resolution for each semiconductor element with a predetermined energy resolution for each semiconductor element to identify non-degraded and degraded semiconductor elements.

15. The apparatus as set forth in claim 14, further including:
a reverse bias circuitry to restore the performance of degraded semiconductor elements, which reverse bias circuitry restores the performance by supplying the reverse bias to the identified degraded semiconductor elements for a preselected time.

16. The apparatus as set forth in claim 15, further including:
a heater to raise an ambient temperature to a preselected level when the reverse bias is supplied to the degraded semiconductor elements to accelerate the restoration process.

17. The apparatus as set forth in claim 16, further including:
a timer which monitors the application of the forward bias to the semiconductor elements for a preselected time and automatically engages the reverse bias circuitry and the heater to restore the identified degraded semiconductor elements, wherein the reverse bias circuitry and the heater are engaged for a predetermined time.

18. The apparatus as set forth in claim 12, wherein the forward bias is selectively supplied to semiconductor elements being selected for testing, which forward bias induces degraded performance in the tested semiconductor elements and further including:
a temperature control unit which increases an ambient temperature to accelerate performance degradation in the tested semiconductor elements.

19. The apparatus as set forth in claim 12, wherein the semiconductor elements include an array of crystals selected from one of cadmium-zinc-telluride crystals and cadmium-telluride crystals.

20. A system for identifying degraded energy resolution of semiconductor gamma radiation detection elements which are used in a gamma radiation detector assembly, the system comprising:
a heater; and
a bias means, the heater and bias means configured for use in identifying semiconductor elements which exhibit degraded gamma radiation energy resolution as compared to a selectable threshold level of gamma radiation energy resolution responsive to heating and bias applied by the heater and biasing combination.

21. The system as set forth in claim 20, further comprising:
restoring means including a reverse bias means which applies a reverse bias to the identified degraded elements for a preselected time.

22. A medical imaging system comprising:
at least one detector comprising a plurality of semiconductor elements;
a means for identifying semiconductor elements which exhibit degraded energy resolution as compared to a selectable threshold level of energy resolution;
a means for restoring the degraded semiconductor elements to an energy resolution above the threshold level; and
screening initiation means that signals a start of a semiconductor element identification process to determine semiconductor elements which exhibit degraded energy resolution.

23. The medical imaging system as set forth in claim 22, wherein the restoring means further includes a reverse bias means which applies a reverse bias to the identified degraded elements for a preselected time.

24. The medical imaging system as set forth in claim 22 wherein the screening initiation means starts the identification process in response to a predetermined time interval, a manual maintenance initiation signal, or a system downtime signal.

* * * * *